(12) United States Patent
Maciolek et al.

(10) Patent No.: US 12,289,519 B1
(45) Date of Patent: Apr. 29, 2025

(54) SENSOR PACKAGE FOR AUTOMATED REMOTE DATA CAPTURE IN PROPERTY APPRAISALS

(71) Applicant: UIPCO, LLC, San Antonio, TX (US)

(72) Inventors: Michael J. Maciolek, Kerrville, TX (US); Donnette L. Moncrief Brown, San Antonio, TX (US); Manfred Amann, San Antonio, TX (US); Timothy Frank Davison, San Antonio, TX (US); Snehal Desai, Richardson, TX (US); Nicole Ferretti, Plano, TX (US); Rachel Michelle Ballew, San Antonio, TX (US); Chung Shing Sheldon Lee, South Jordan, UT (US); Martin Lopez, Frisco, TX (US); Kelsey Anne O'Brien, Austin, TX (US); Melissa Jane Porter, Lutz, FL (US); Sayeef Rahim, Allen, TX (US); Eric David Schroeder, San Antonio, TX (US); Steven J. Schroeder, Dak Point, TX (US); Joseph Michael Vesco, Sparks, NV (US)

(73) Assignee: United Services Automobile Association (USAA), San Antonio, TX (US)

( * ) Notice: Subject to any disclaimer, the term of this patent is extended or adjusted under 35 U.S.C. 154(b) by 116 days.

(21) Appl. No.: 18/192,900

(22) Filed: Mar. 30, 2023

Related U.S. Application Data

(60) Provisional application No. 63/362,141, filed on Mar. 30, 2022.

(51) Int. Cl.
*H04N 23/661* (2023.01)
*G06Q 50/163* (2024.01)
*H04W 4/021* (2018.01)

(52) U.S. Cl.
CPC ......... *H04N 23/661* (2023.01); *G06Q 50/163* (2013.01); *H04W 4/021* (2013.01)

(58) Field of Classification Search
CPC .... H04N 23/661; G06Q 50/163; H04W 4/021
See application file for complete search history.

(56) References Cited

U.S. PATENT DOCUMENTS

| | | | |
|---|---|---|---|
| 8,346,578 B1* | 1/2013 | Hopkins, III | G06Q 30/02 705/14.66 |
| 2005/0234785 A1* | 10/2005 | Burman | G06K 17/00 705/28 |
| 2008/0100705 A1* | 5/2008 | Kister | H04N 7/188 348/143 |
| 2009/0182749 A1* | 7/2009 | Walker | G06Q 10/00 |

(Continued)

Primary Examiner — Richard A Hansell, Jr.
(74) Attorney, Agent, or Firm — Plumsea Law Group, LLC

(57) ABSTRACT

A package in which an onboard computing system and a plurality of sensor devices are embedded. The package includes a plurality of cameras that are positioned against sidewalls of the package in order to capture image data of the external environment. When the computing system determines the package has arrived at a predesignated set of coordinates corresponding to a target property for which an appraisal is to be performed, the cameras are activated and begin collecting image data. The image data is transmitted to a remote server which will store the image data for review by insurance personnel.

20 Claims, 11 Drawing Sheets

(56) References Cited

U.S. PATENT DOCUMENTS

| | | | |
|---|---|---|---|
| 2009/0265193 A1* | 10/2009 | Collins | G06Q 30/0185 |
| | | | 901/46 |
| 2010/0113654 A1* | 5/2010 | Sugata | C08K 5/5313 |
| | | | 524/101 |
| 2017/0199647 A1* | 7/2017 | Richman | G05D 1/0016 |
| 2018/0158156 A1* | 6/2018 | Dintenfass | G06F 21/32 |
| 2019/0019225 A1* | 1/2019 | Lammert, Jr. | H04N 23/60 |
| 2020/0193538 A1* | 6/2020 | Kameta | H04L 9/0643 |
| 2020/0349505 A1* | 11/2020 | Coleman | G06K 19/06028 |
| 2021/0110137 A1* | 4/2021 | Kerzner | G06F 18/2413 |
| 2022/0116535 A1* | 4/2022 | Gaw | G06T 7/277 |
| 2023/0294313 A1* | 9/2023 | Pryor | G01N 29/265 |

* cited by examiner

SENSOR PACKAGE FOR AUTOMATED REMOTE DATA CAPTURE IN PROPERTY APPRAISALS

CROSS-REFERENCE TO RELATED APPLICATION

This application claims the benefit of U.S. Provisional Patent Application Ser. No. 63/362,141 filed on Mar. 30, 2022 and titled "Container and Service for Property Appraisals", the disclosure of which is incorporated by reference herein in its entirety.

TECHNICAL FIELD

This disclosure relates generally to systems and methods for facilitating property appraisals, and more particularly to automated remote image capture by cameras installed in a container that are shipped to a property.

BACKGROUND

Following disasters such as floods, earthquakes, hurricanes, fires, and tornadoes, entities that insure properties in the disaster area may need to survey the area in order to assess any damage that has impacted one or more insured properties. For individual properties, inspectors must visit the site and collect images that may later be used by the insurer. These images can be used to identify generally whether a structure has been damaged. However, obtaining further information regarding the extent of such damage has remained a time-consuming and resource intensive task, typically requiring a human agent to visit the structure in person at the time of underwriting to more closely examine the property and maintain a baseline record in case of subsequent damage that will be compared to later images. When a homeowner applies for insurance, deployment of a human agent to the site to capture the required images can lead to delays for homeowners and other insured entities in receiving approval. The ability to quickly and accurately capture data about a structure, without the need for on-site manual inspections or other time-intensive tasks, and with minimal cost, is highly desirable.

There is a need in the art for a system and method that addresses the shortcomings discussed above.

SUMMARY

In one aspect, embodiments include a method of remote data capture for property appraisals. The method includes a first step of determining at a first time, at an onboard computing system for a package, the package is in a first range of a first target property. A second step includes initiating, in response to determining the package is in a first range of a first target property, an image capture session in which a first camera installed in the package is automatically activated. A third step includes collecting first image data about an external environment associated with the first target property via the first camera. In addition, a fourth step includes transmitting the first image data from the onboard computing device to a remote server via a network.

In another aspect, embodiments include a data collection shipping package that can be delivered to an address and perform automated image data capture on-site at a target property. The package includes a first camera mounted in an interior of the package, wherein a lens for the first camera is aligned with an aperture formed in a sidewall of the package, and a GPS-enabled device configured to generate location geodata for the package in real-time. The package also includes a computing system configured to activate the first camera in response to geodata indicating the package is in a vicinity of a target property, and a rechargeable power source supplying power to the first camera, the GPS device, and the computing system.

In yet another aspect, embodiments include a property appraisal system that includes a processor and machine-readable media including instructions which, when executed by the processor, cause the processor to determine at a first time, at an onboard computing system for a package, the package is in a first range of a first target property, and to initiate, in response to determining the package is in a first range of a first target property, an image capture session in which a first camera installed in the package is automatically activated. The instructions further cause the processor to collect first image data about an external environment associated with the first target property via the first camera, and to transmit the first image data from the onboard computing device to a remote server via a network.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The proposed embodiments describe a system and method for use of an appraisal sensor package (ASP) to remotely capture image data. In one example, a system comprising a package with embedded sensors could be used to capture images of a house (or other building/property), along with its precise GPS location. The package could be mailed to a member and actuated when the package is delivered to the house. As a delivery worker walks or carries the package to the front door, cameras in the package, which would be exposed on the exterior, could capture images of the property from various angles. An internal GPS sensor could also determine precise coordinates for the location of the house, or for various parts of the house/property. In some cases, sensors such as accelerometers or other suitable sensors could be used to measure distances as the package is delivered from the street to the front door. All of the data that is collected could be used to provide up-to-date images of houses for insurance underwriting, and to confirm a precise the location of buildings on a property, which may be useful after a catastrophe or for other purposes.

In some embodiments the package may include a wireless networking device so that data can be collected and then transmitted to a remote server through a property owner's Wi-Fi network. In some cases, the package could communicate directly with an application ("app") associated with the insurer (for example, using Bluetooth or Near Field Communication), to avoid the need to obtain a Wi-Fi password. Once the package has been delivered, the resident could prepare the package to be shipped to another address, rather than having the package shipped back to the insurer facility directly, thereby expediting the data collection process and decreasing costs associated with shipping. To facilitate person to person shipping, the package could use e-ink, or other electronic labels that can be easily changed automatically without requiring much effort from the member.

Figure 1:
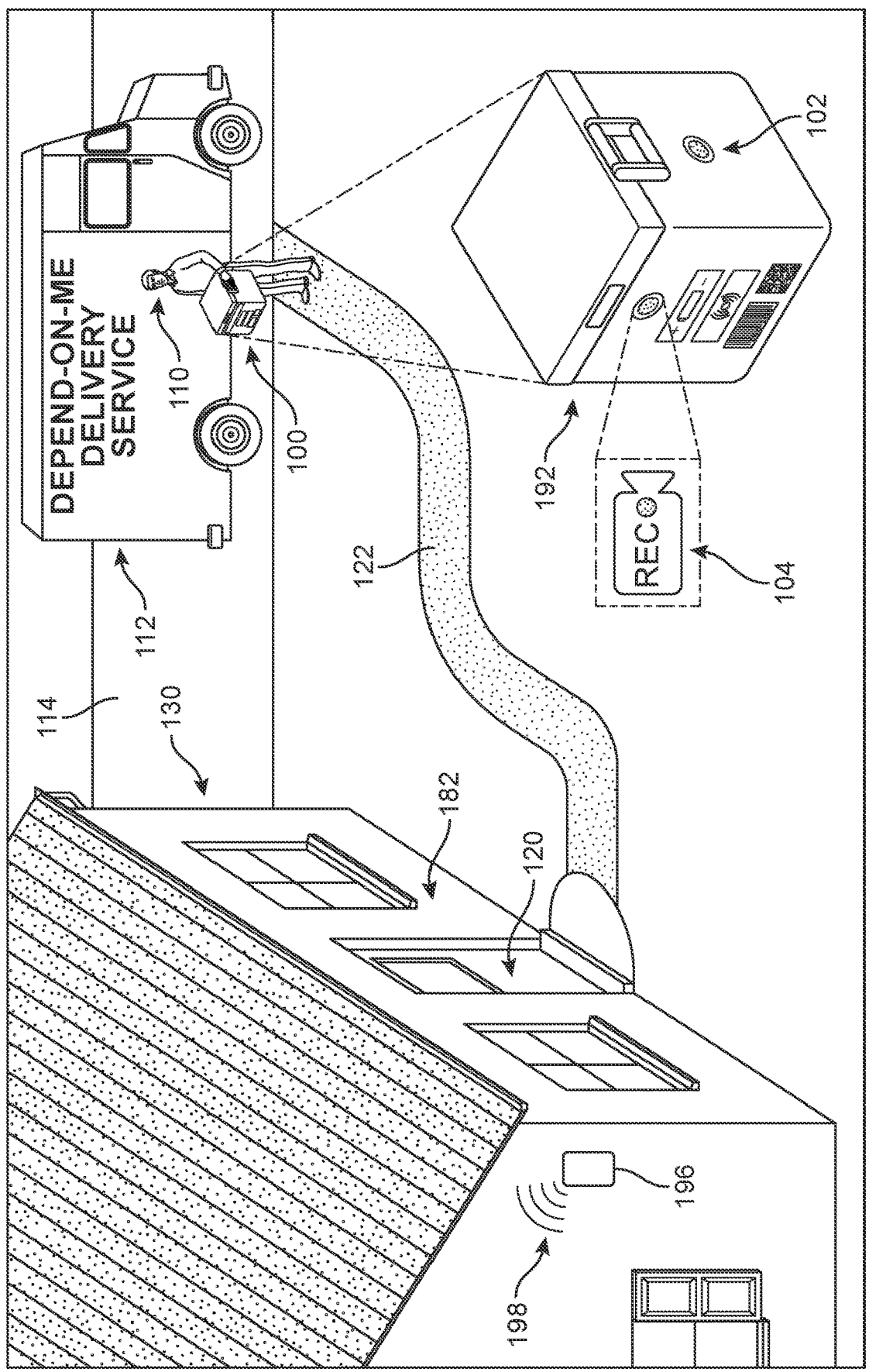
FIG. 1 is a depiction of a delivery person bringing a package to a residence, where cameras installed in the package are automatically activated when the package is in vicinity of the residence, according to an embodiment.

For purposes of introduction, an overview of one embodiment of the proposed systems and methods is illustrated with reference to FIG. 1. In FIG. 1, a delivery truck 112 has arrived at a first property 130 via a first road 114. A delivery person 110 is carrying an embodiment of a sensor-embedded package ("package") 100 addressed to the first property 130 owner from the truck 112 to a front door 120 of the first property 130. In a magnified view 192 of package 100, it can be seen that an exterior of the package 100 includes a plurality of image sensors ("cameras") 102, including a first camera 104. As will be discussed in greater detail below, once the truck 112 was in a particular zone or range proximate to the first property 130-in this case, around the periphery of the first property 130 near road 114, the cameras 102 were automatically enabled, or began to record surrounding imagery. While the delivery person 110 walks along pathway 122 leading to front door 120, the cameras 102 continue to collect image data of the external environment. In other words, images of various aspects and features of a main building 182 on first property 130, as well as the land around the main building 182, will be captured by cameras 102. In addition, a location tracker (not shown in FIG. 1) will ensure each image segment is geotagged to allow for the accurate identification of a structure and its location relative to other structures around the property. In some embodiments, the package 100 includes a wireless communications module (not shown in FIG. 1) for receiving and transmitting data from a processor unit in the package 100. While in some embodiments the communications module can directly communicate with a remote server via a cellular network, in other embodiments, the communications module is configured to detect nearby Wi-Fi, NFC, or Bluetooth networks and initiate a connection. This connection is then used to transfer data back to the remote server.

Figure 2:
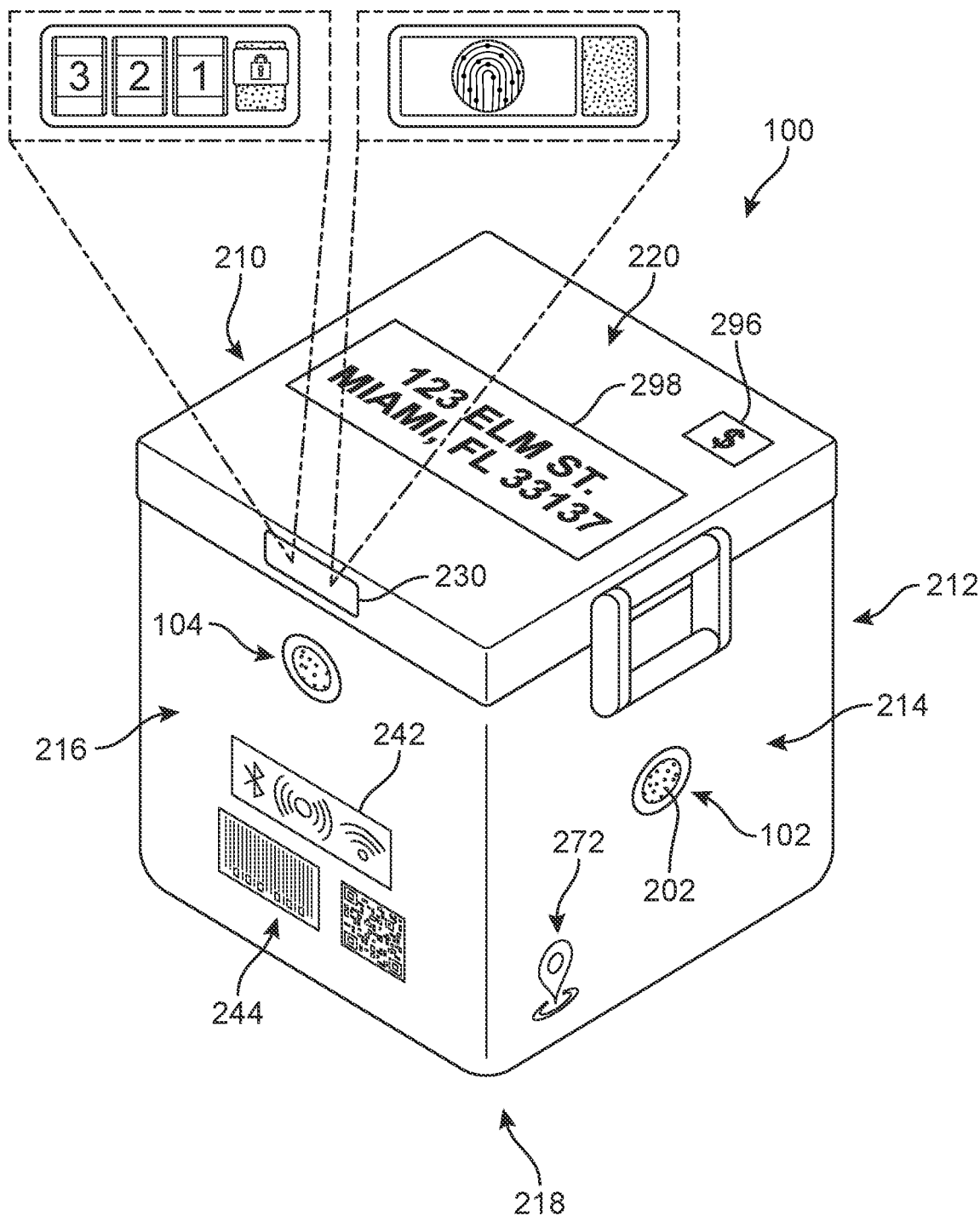
FIGS. 2, 3A, and 3B depict one example of an appraisal sensor package configured to collect image data of a target property, according to an embodiment.
Figure 3A:
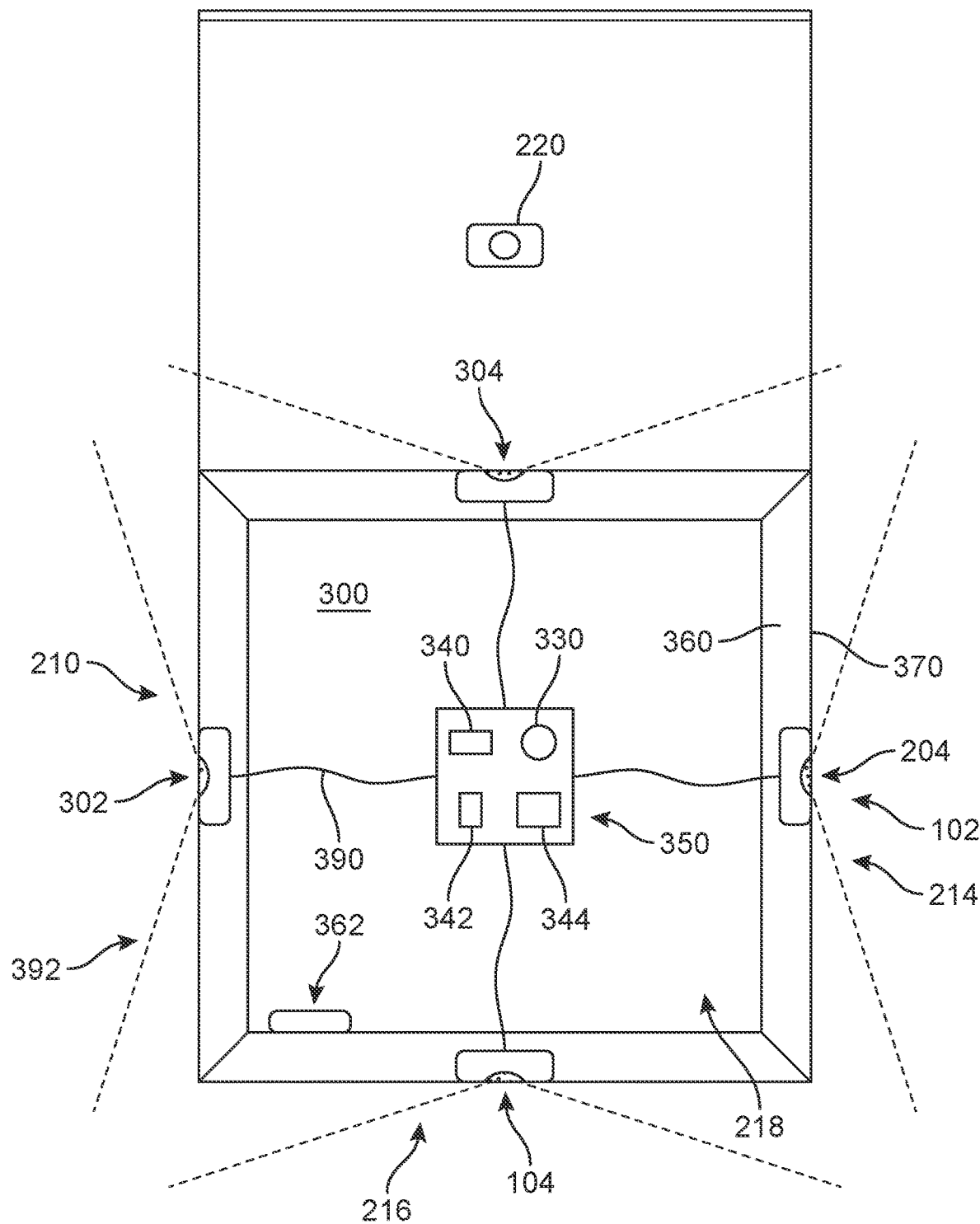
Figure 3B:
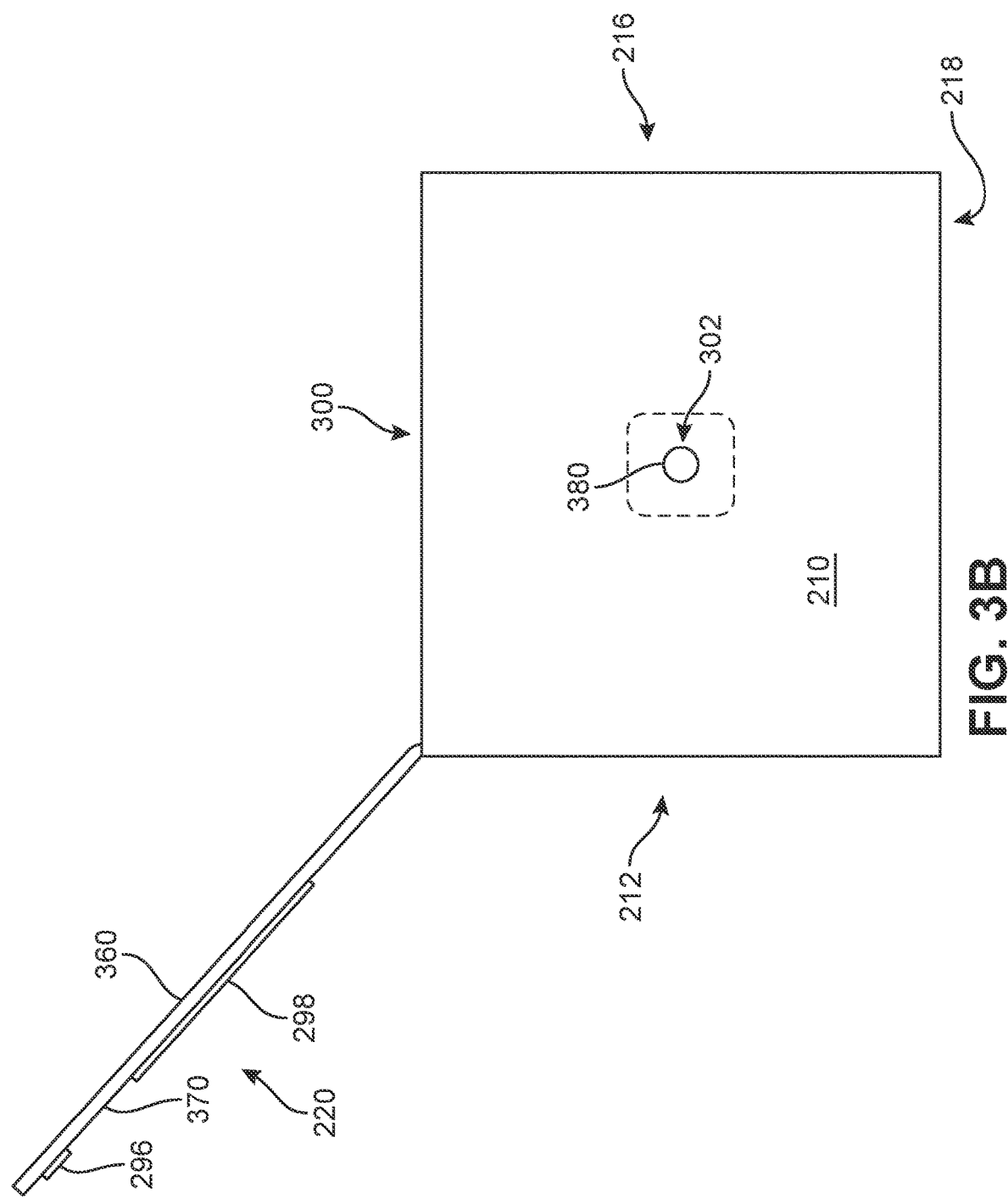

Referring now to FIGS. 2, 3A, and 3B, an embodiment of the package 100 is depicted in isolation for purposes of clarity. FIG. 2 presents an isometric sealed view of package 100 (closed state), as it might appear at the time of shipping and delivery. FIG. 3A presents a top-down view of the package 100 when opened (in cases in which a lid 220 is attached by a hinge or other movable connecting mechanism) and FIG. 3B presents a side-view of the opened package 100 (open state).

In the closed state shown in FIG. 2, the package 100 can be seen to include a first sidewall 210, a second sidewall 212, a third sidewall 214, and a fourth sidewall 216 that together provide a substantially continuous rectangular perimeter, and form a box with a base 218. As shown in FIGS. 2, 3A, and 3B, in different embodiments, the package 100 includes a plurality of embedded components. In FIG. 2, for purposes of simplicity, various symbolic panels and components are depicted on an exterior surface of the package, including communications module 242 and location tracker device 272. Furthermore, in some embodiments, the package 100 can include identifier markings 244 such as a bar code or QR code (or other identifier such as alphanumeric characters) that can be scanned or otherwise inputted into the associated computing system for tracking and assignment of the package to and/or from a destination. In some embodiments, containers may include identification features disposed on an exterior surface. The identification features may allow a computer system to identify the package. Some examples of an identification mark can include; a barcode, alphanumerical code, label, icon, or quick response (QR) code. In other embodiments, any other kind of identifier or indicia could be used with the package. In addition, multiple cameras 102 represented here by first camera 104 and a second camera 204, are also installed in package 100. In some embodiments, the cameras are standard digital cameras, while in other embodiments, the cameras may also be configured to collect night-vision data in response to low lighting conditions.

In different embodiments, a package may include various mechanisms and systems for accessing and/or securing the components or other contents stored in its interior. A secured access system 230 can be configured to communicate and/or respond to, for example, signals emitted by near field communication (NFC) technology via a proximity sensor, for example, or an input mechanism (e.g., an Interactive display or keypad) for receiving input from a user to verify his or her identity or authority to access the container, by, for example, entering a PIN or a VIP code. In some embodiments, an interactive display may issue these instructions visibly on display. A VIP code is a code-often a numeric code-that is transmitted to a device held or viewed by the user and that is only valid for a short period, such as 30 seconds or a few minutes. It may alternatively issue these instructions audibly via a speaker incorporated into the container housing. The user's identity may also or alternatively be verified by biometric scanner, which could include, for example, using facial recognition based upon the user's facial features, voice recognition based upon a voiceprint of the user, a retinal scan and/or fingerprint identification. In other embodiments, as shown in FIG. 2, a physical locking and unlocking mechanism such as a fingerprint scanner and/or a keypad may be included to allow for secure access to the package contents.

In addition, as noted above, some embodiments may include provisions for tracking or otherwise locating or determining a route of the package 100. In some embodiments, a package could be provided with location tracking device 272 beacon (or tracking device), such as tracking beacon. Different kinds of tracking beacons could be used, including blue-tooth enabled tracking beacons, Wi-Fi enabled tracking beacons, cellular enabled tracking beacons, GPS enabled tracking beacons or any other kinds of tracking beacons. Generally, the type of tracking beacon used may be selected to optimize the range of tracking and the power needs of the beacon. For example, Bluetooth enabled beacons may have low power consumption but may only be detectable in a limited range. Various kinds of GPS enabled tracking systems may facilitate tracking over a longer range but may consume significant power. In some embodiments, a tracking beacon could be incorporated into the interior void/chamber of the package or integrated or attached to a surface of its housing.

It can be appreciated that the GPS device installed in the package 100 can be configured to generate location data ("geodata") corresponding to the current location of the package 100. This geodata, which can be produced in real- or near-real-time, is received by the onboard computing system and used to determine whether the package has come into a particular range of the target property. For example, if the target property is associated with a first set of coordinates, the onboard computing system can determine if the current geodata places the package within a preset range ("vicinity") of the target property. Once the computing system verifies that the package is at or around the correct location, an activation event is logged, which causes a control signal that activates the cameras and other sensor devices installed in the package. In other words, image and other sensor data for the external environment around the package will be restricted to prevent (a) a continuous drain on the onboard battery, (b) undesirable intrusions of privacy (e.g., in the delivery person's personal space), and (c) to minimize the processing power and storage capacity required by the package's operations. After activation, the computing system can determine a deactivation event has occurred, for example when a pre-set timeout period has elapsed (e.g., 5 minutes, 10 minutes, half an hour, one hour, etc.), when a pre-set condition has occurred (e.g., lighting conditions are no longer conducive to collection of any image data, the package has been stationary for longer than pre-set duration, etc.), or when the package has moved outside of the specified vicinity of the target property. Thus, geodata—along with location data for the target property—can be used by the computing system to cause both the activation and deactivation of devices and/or components installed onboard. In different embodiments, the "vicinity" or range that can be set will typically include a boundary surrounding the target property and its associated structures, and in some cases, be extended further by 10-50 feet to ensure timely activation of the cameras.

In some embodiments, the package 100 also includes provisions for inter-property package transfer, which will be discussed in greater detail with reference to FIG. 8. For example, an e-ink-based display 298 such as e-paper can be used to update the delivery address with little drain on battery 240 in response to a trigger event, as once the image or characters on the electronic paper have been set, it requires no power to maintain, so the readout can be seen even when the device is unpowered. In some embodiments, a reusable postage marking 296 can allow for the package to be conveyed to its next destination without requiring any affixation of label or payment by the current addressee.

Furthermore, it should be understood that embodiments are not limited to the particular size and shape of package 100. In other embodiments, other types of packages could be used. For example, a package can include a bag, soft sided or hard shell sided container, box, parcel, or other item such as shoulder bag containers, hand-held containers, duffle bag containers, rolling containers, compactable containers, as well as others. Thus, any protective housing that can be shipped and securely hold the recording system (electronics, battery, and computing device) can be used.

In FIG. 3A, the lid 220 has been pulled open from the box to reveal interior chamber 300, which is bounded by interior surface 360 of the package's walls. Secured within the chamber 300 is a computing system 350. Although the computing system 350 is shown as attached or mounted on interior surface 360 of base 218, in other embodiments, computing system 350 can be disposed anywhere within the chamber 300, including along the remaining interior surfaces. It should be understood that the term "computer system" refers to the computing resources of a single computer, the partial computing resources of a single computer, a plurality of computers communicating with one another, or a network of remote servers. In one embodiment, computer system 350 includes at least one server having at least one processor. In this example, computing system 350 includes at least a processor 344 and memory 342, and a controller 340.

In different embodiments, the computing system 350 is connected to one or more sensor devices 330. Some non-limiting examples of such sensors include (a) Smoke, Gas and Alcohol (and/or other chemicals) sensors; (b) Temperature sensors; (c) Pressure sensors; (d) Cameras and other image and/or light sensors; (e) Smoke/Flame sensors; (f) Moisture/Humidity sensors; (g) Electrostatic sensors; (h) Audio sensors and other sound/volume sensors (e.g., microphones); (i) Motion/speed sensors; (j) Gyroscopes; (k) Accelerometers; (l) Wind Speed sensors; (m) Proximity sensors; and (n) Infrared and Heat sensors. In addition, in some embodiments, sensors can include ultrasonic sensors, touch sensors, aerosol characterization sensors, magnetometers, color sensors, tilt sensors, and flow and level sensors. Thus, in different embodiments, sensor devices 330 may collect data regarding location, speed, and direction of the package 100 and/or of objects near the package. In cases in which temperature sensors are included, the system can be configured to also monitor the temperatures of nearby structures, or infrared data can be used to help determine a likely stability level for a structure or potential internal damage.

In some cases, sensors can refer to one or more of a stationary internet of things (IoT) device(s) ("smart sensors") that communicate over a network. Smart sensors could comprise any of a variety of different IoT devices and other smart devices that may include one or more sensors. Supplemental data from such smart sensors can be received by the system and used to determine property information with more precision. In different embodiments, data collected by sensor devices 330 can be used by the computing system 350 to identify when actuation of the data collection process should be initiated, as will be discussed in FIGS. 7A-7C.

In different embodiments, package 100 can include a power source, such as onboard battery 362. The onboard battery 362 may be charged by connection of an electrical source to an outlet and/or a solar panel (not shown) that may be installed along an outer wall of the container. In some embodiments, the onboard battery 362 may be any kind of battery known in the art. For example, onboard battery 362 could be a rechargeable lithium-ion battery. In embodiments where onboard battery 362 is rechargeable, power for recharging it could be supplied by a solar panel. In other embodiments, a non-rechargeable battery could be used. Onboard battery 362 may be used to power a variety of different items, including cameras 102, onboard computing system 350, sensor devices 330, communications module, and/or location tracking device. If an electronic locking system is used, such as a fingerprint reader or display, the battery 362 could also be used to power the such systems. The insurer facility or other package management center can store the package in a charging mode until the package is moved to ensure the power supply remains full prior to any appraisal session. Thus, in some embodiments, chamber 300 can include wiring 390 providing power and data transfer between the embedded components.

In some embodiments, the package 100 includes provisions for ensuring the components stored within are protected from external forces and elements. For example, some embodiments can include provisions that protect the contents of package in high temperature or fire conditions. In one embodiment, some or all exterior or outermost (exposed) portions of the package 100 can include a flame-resistant layer or coating. In some embodiments, flame-resistant layers may also be waterproof, such that the interior chamber 300 remains dry when the package is immersed in liquid. Some embodiments can include provisions to increase the buoyancy of the package. In some embodiments, some or all portions of outer walls are buoyant or inflate upon contact with, submersion, and/or immersion in water.

In different embodiments, exterior surface 370 of the package 100 can include a plurality of apertures through which the lens of cameras 102 mounted within the chamber 300 can capture images of the external environment. For purposes of illustration, cameras 104 include first camera 104, second camera 204, third camera 302, and fourth camera 304. In other embodiments, fewer or additional cameras 102 may be installed, positioned such that a wide-angle lens of the camera is aligned with an aperture formed in the package, and field of view 392 is as wide as possible. Thus, it should be appreciated that each sidewall can include no camera, one camera, or two or more cameras, where each cameras has a corresponding opening in the external surface of the package to ensure an unobstructed field of view for the camera's lens. The cameras can be positioned at each corner of a sidewall, for example, or near the top and bottom of each sidewall. In some embodiments, one or more cameras can be installed against the base 218 to allow for image capture of the ground on the target property.

The side-view of FIG. 3B depicts an example of an aperture 380 formed in the first sidewall 210 of the package 100, and associated third camera 302 depicted in dotted lines as being 'behind' the first sidewall 210. Thus, aperture 380 can be understood to refer to a through-hole that extends from the exterior surface 370 to interior surface 360 where camera is mounted.

Figure 4:
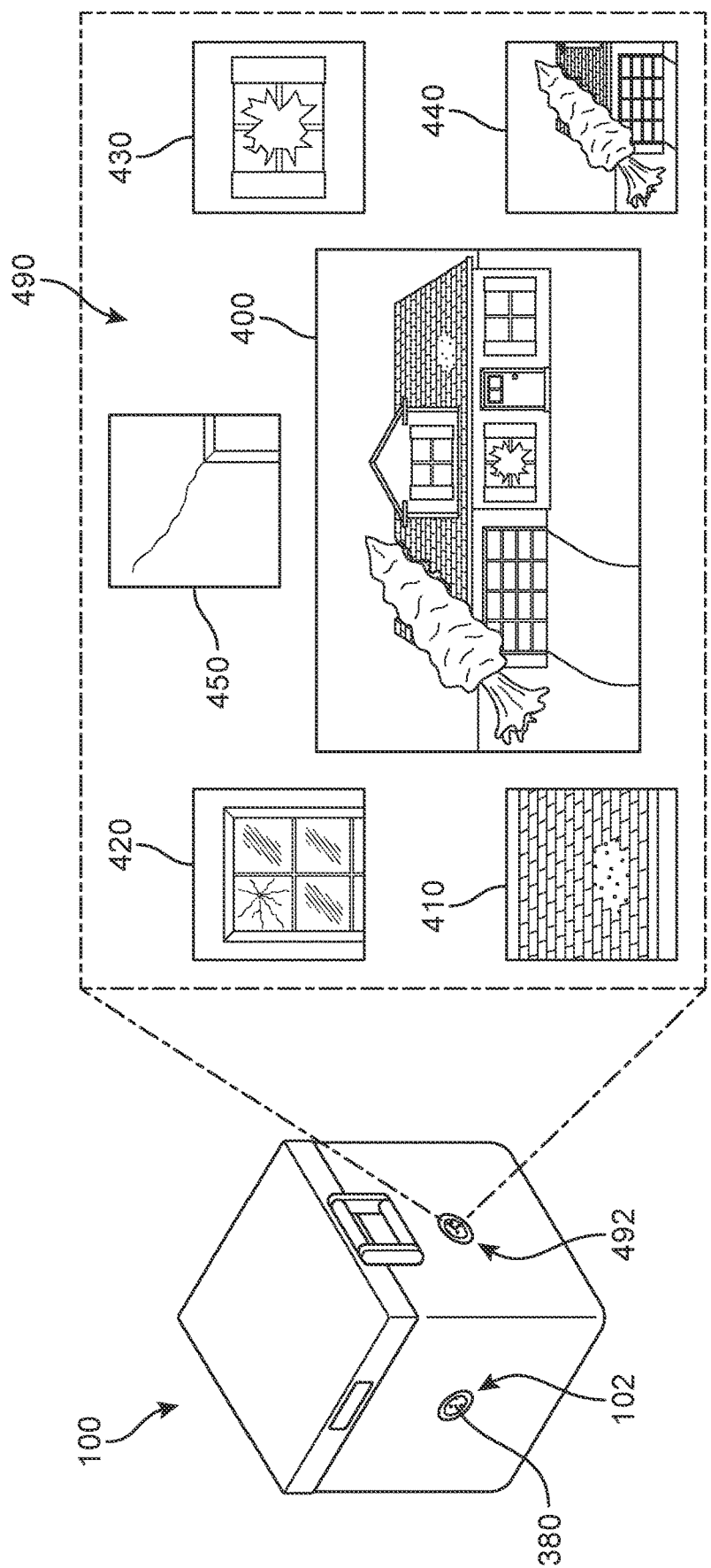
FIG. 4 is a depiction of an appraisal sensor package capturing multiple images of a structure, according to an embodiment.
Figure 5:
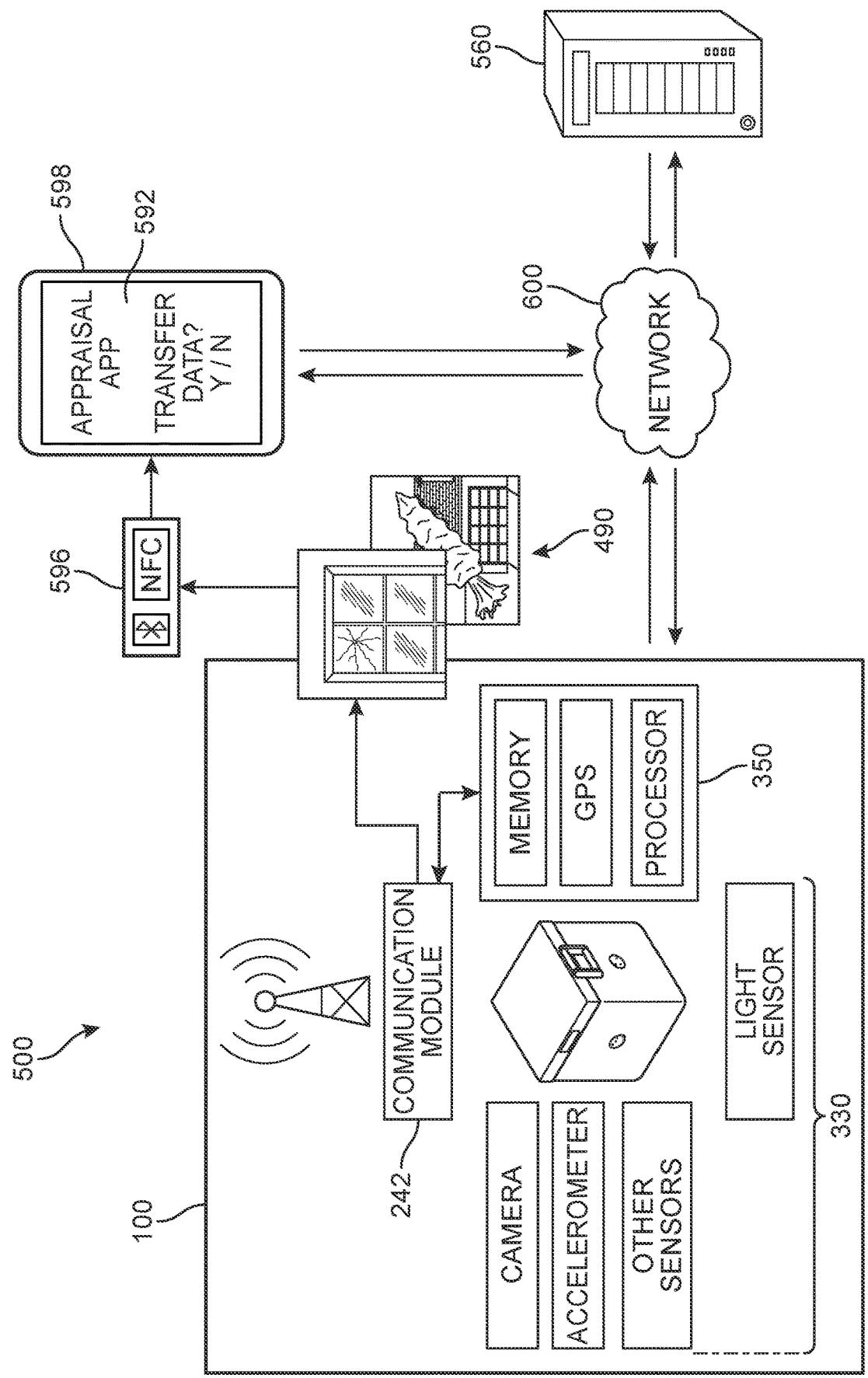
FIG. 5 is a schematic diagram depicting the transfer of data via a network between the appraisal sensor package, a remote server, a local computing device, according to an embodiment.

Referring now to FIG. 4, when package 100 is delivered to a specific address or set of coordinates in response to a claim appraisal request, the cameras 102 mounted behind each of a plurality of apertures 492 become activated. In FIG. 4, the collection of image data 490 as the package 100 travels toward a residence 400 on the target property can comprise multiple features, such as a first window 420, a roof portion 410, a second window 430, a wall crack 450, and a garage 440. In FIG. 5, an environment 500 shows how the collected image (and/or other) data 490, processed and stored on computing system 350, can be transferred to a remote server 560 via a network 550. In some embodiments, the data 490 can be passed to the server 560 over a cellular network. In other embodiments, the data 490 is first passed to an app 592 running on a local computing device 598 such as a cell phone or other user computing device over NFC or Bluetooth 596, and the app 592 relays the data 490 to the server 560.

Thus, in some embodiments, a user device on-site at the target property can receive a secure NFC signal via an NFC module for the device. The acronym "NFC" as used herein refers to "Near-field Communication," which typically uses 13.56 MHz electromagnetic waves. In one embodiment, the signal is generated or otherwise provided by the app 592. In different embodiments, the user may activate the app simply by clicking on the app on the user's smart phone, initiate a request, and then bringing their smart phone in close proximity to the NFC component of the package 100. Once the request is received, and the smart phone is in sufficiently close proximity to the package 100, the smart phone (or other user device 598) and the NFC components can interact with each other so that the signal can be sent to the remote server 560 through the app 592. In some embodiments, the package 100 includes electrical circuits that can act as a passive Radio-Frequency Identification (RFID) tag, that is energized by electromagnetic waves broadcast by the smart phone and coupled to electrical circuits in the smart phone. In one example, the package 100 can include a chip that is connected to an antenna for receiving NFC electromagnetic waves broadcast by the smart phone. In other embodiments, instead of using electromagnetic waves at the NFC frequency, the electromagnetic waves may be broadcast at another frequency, such as at a Bluetooth frequency of 2.4 to 2.5 GHZ, or at an LF frequency in the 120 to 150 KHz range. The electromagnetic waves could also be broadcast at any other frequency that might currently or in the future be used by the smart phones, such as, for example, 850 MHz, 900 MHZ, 1,800 MHz and 1,900 MHz frequencies, or any other frequencies that may be developed for possible use by smart phones in the future. The electromagnetic waves broadcast by user device 598 may carry data such as the smart phone's number and/or IP address and may also include additional data, such as a personal identification number or PIN, fingerprint data, voice data, password data and/or facial recognition data that may be used to verify the property owner's location and consent to the data collection.

In different embodiments, app 592 can be accessed via any user computing device configured for connection to a network. The app 592 can provide an interface presented on the display of the user's computing device offering content via native controls included in the interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls.

In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In different embodiments, devices and components of environment 500 can communicate with each other and with other components of environment 200 over one or more networks (shown here as network 550). The network 550 may comprise any number of electronic devices and use any number of communication protocols to facilitate data communications within the network 550. One having skill in the art would appreciate that the network 550 may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network 550 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 550 may include a physical and/or logical architecture defined by firewalls, proxy servers, routers, switches, or similar features that implement various levels of security and my function as logical gateways or boundaries.

In another example, the user device 598 can be configured to provide remote viewing access to a registered property owner. Data collected by the various package components (light, camera, temperature sensors, etc.) can be viewed by the registered owner via the app 592 for example, and/or a history in which all data collection events involving their property are logged.

Figure 6:
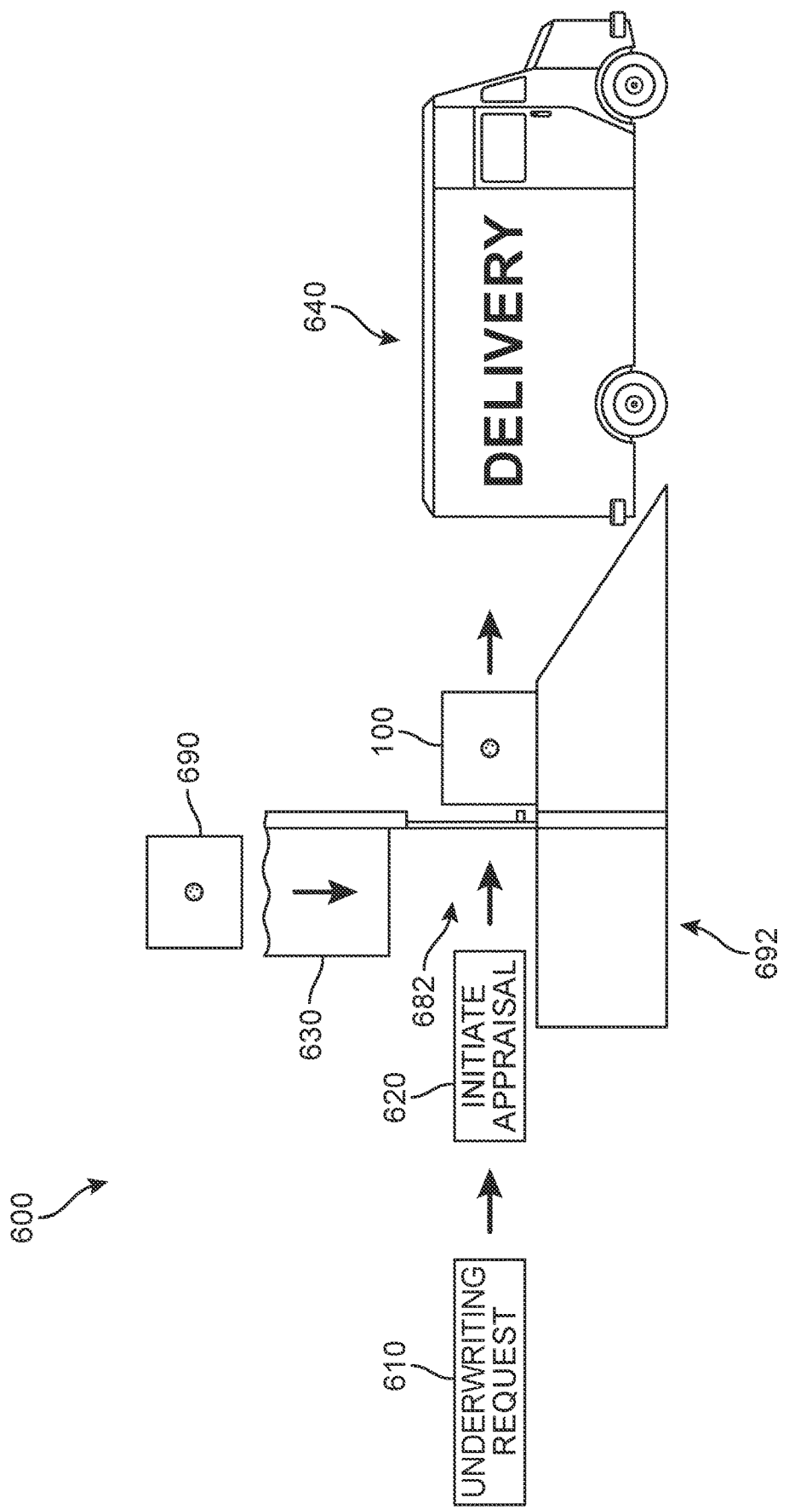
FIG. 6 is a schematic diagram showing the dispatch of an appraisal sensor package in response to an underwriting request, according to an embodiment.

Referring next to FIG. 6, a schematic flow diagram 600 of an embodiment of a package dispatch process is depicted. Following an underwriting request 610 automatically generated in response to an applicant's request for an appraisal, or in response to a claim for covered damages, an appraisal control signal 620 can be transmitted to a facility 692 where packages 690 of varying sizes, shapes, dimensions, and sensor capacity have been prepared and await dispatch. Depending on the request, a particular type of package (such as package 100) can be selected and transferred from a holding area to a conveyer area 682. The computing system for the package 100 receives property details for the target property, such as an address and GPS coordinates. The package 100—including in some embodiments, an e-ink based display on which the target property address is then automatically rendered or otherwise presented-is then moved to a delivery truck 640.

Figure 7A:
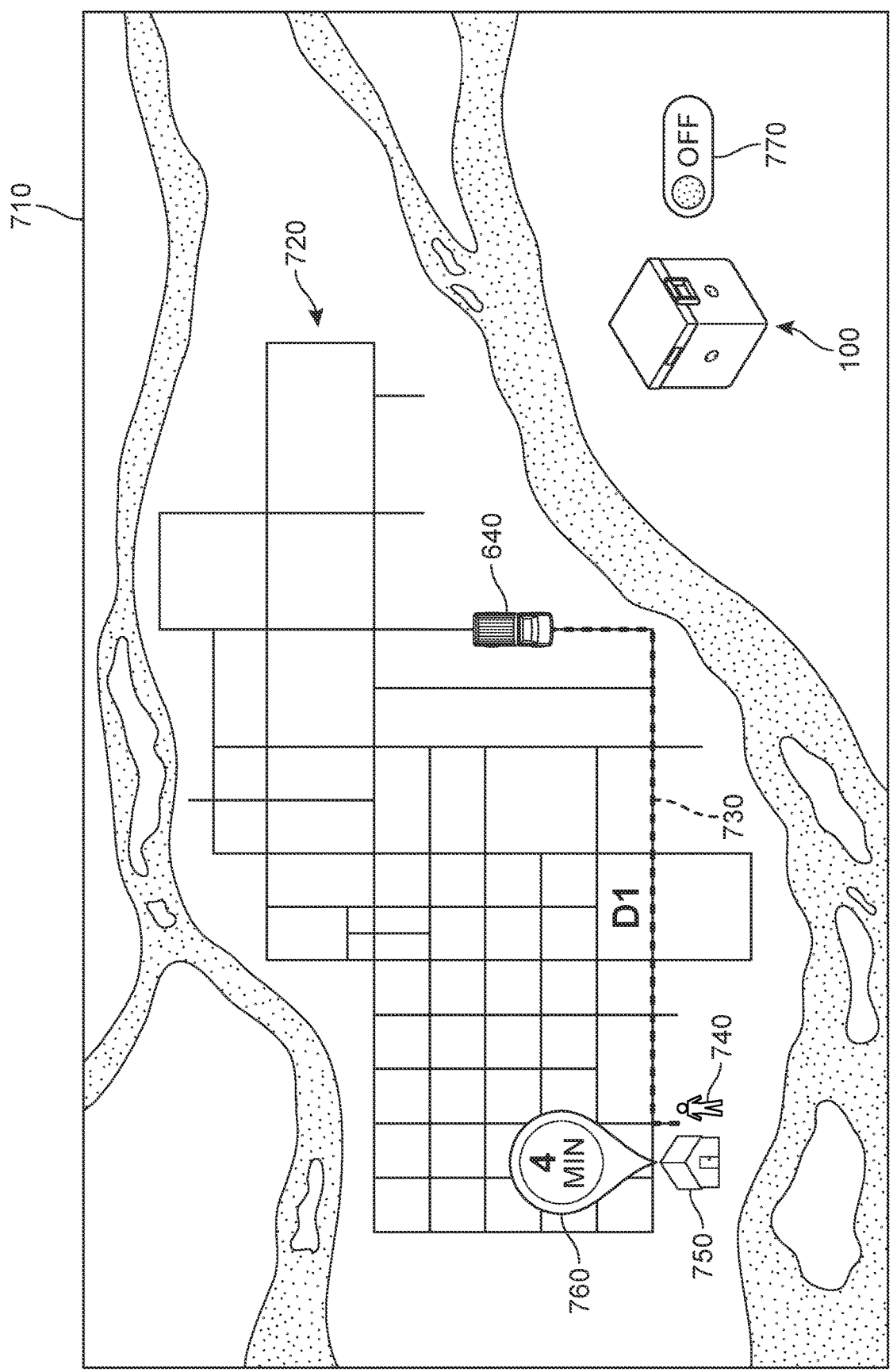
FIGS. 7A, 7B, and 7C depict a process of delivering an appraisal sensor package and the use of geodata in causing activation of the onboard cameras, according to an embodiment.
Figure 7B:
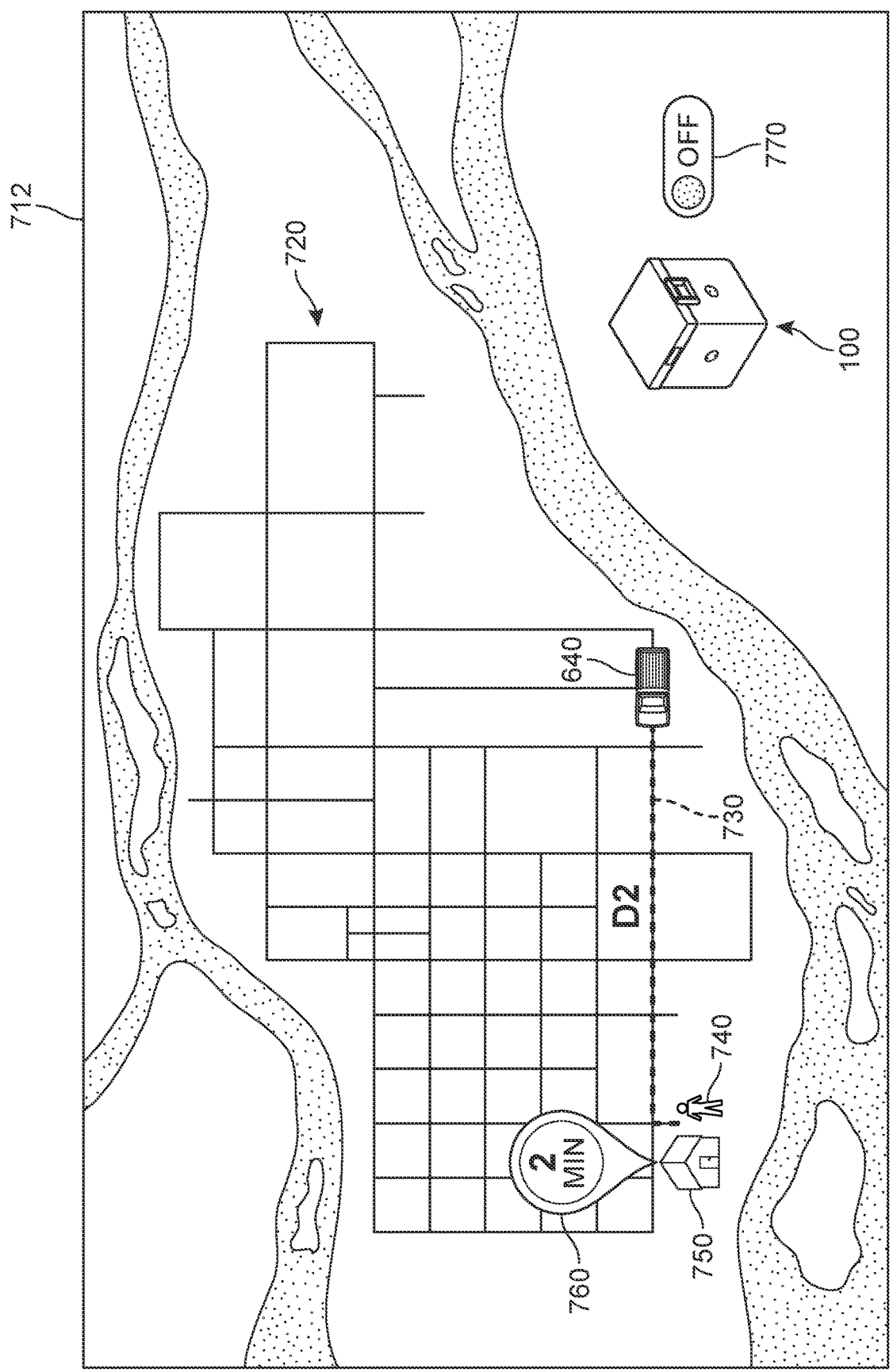
Figure 7C:
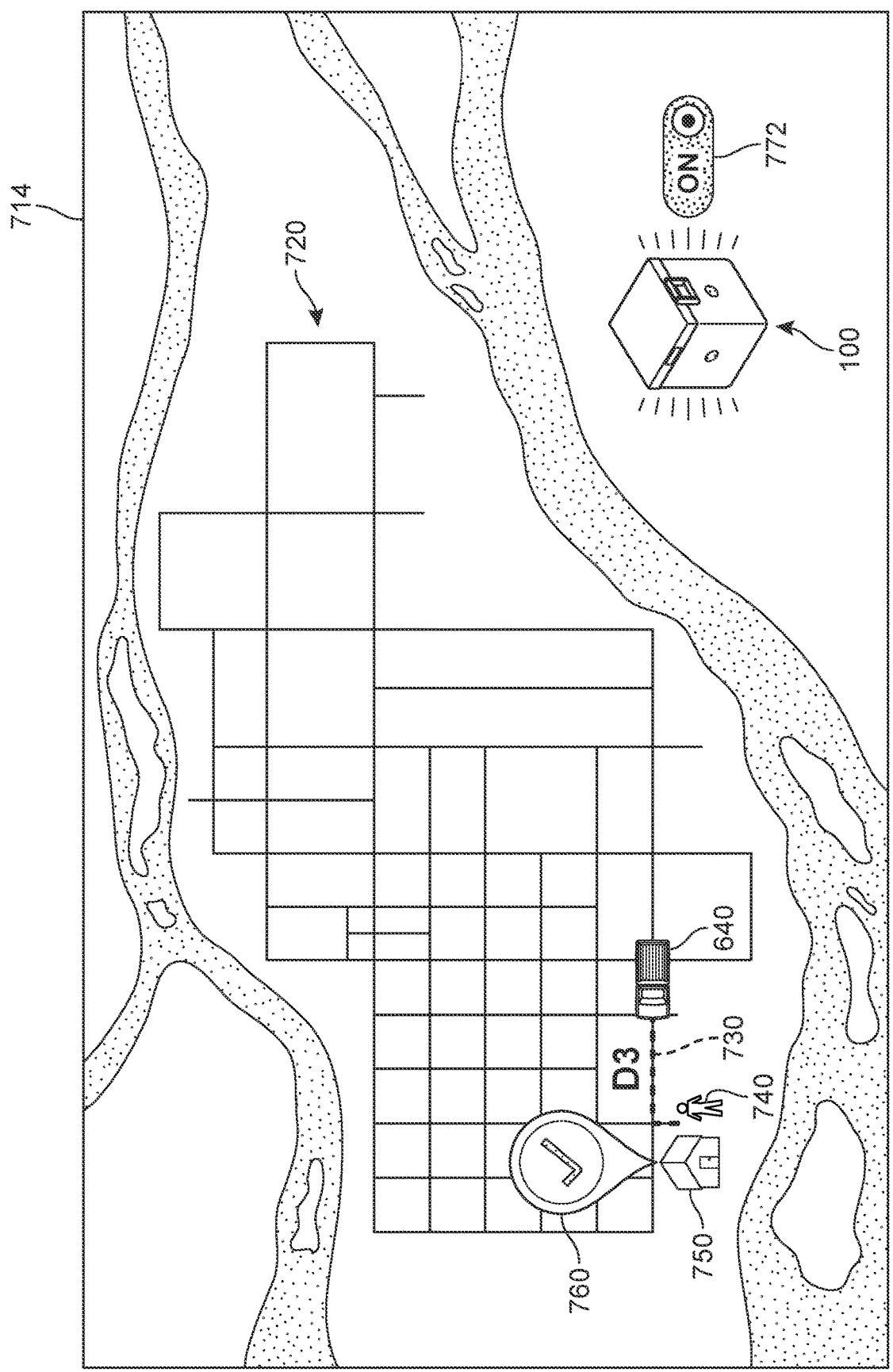

In different embodiments, as the package is in transit (e.g., by a vehicle such as a plane, truck, ship, drone, etc.), its location can be monitored in a continuous or semi-continuous manner, for example via the onboard location tracker. FIGS. 7A, 7B, and 7C are a sequence of drawings depicting the delivery and actuation process for a package. A first view 710 of a city grid 720 at a first time is shown in FIG. 7A, where a vehicle (such as delivery truck 640) in which the package 100 is loaded (and currently in a disabled state 770 with respect to image data collection) travels toward a target property 750, associated with an owner 740. At this time, the truck 640 is a first distance D1 from the target property 750, or about 4 minutes as estimated by onboard GPS tracking device 760.

In FIG. 7B, a second view 712 (at a second, subsequent time) of the city grid 720 is presented, and truck 640 is now at a second distance D2 away from the target property 750 that is less than the first distance D1. The onboard GPS tracking device 760 now estimates arrival at or near the target property 750 in approximately two minutes. In some embodiments, the onboard computing system may at this time enter a pre-waking mode, in anticipation of the upcoming arrival event.

In FIG. 7C, a third view 714 (at a third, subsequent time) of the city grid 720 is presented, and truck 640 is now at a third distance D3 away from the target property 750 that is less than the second distance D2. The onboard GPS tracking device 760 now estimates arrival has occurred at or near the target property 750. In response to this determination, the package 100 transitions from the disabled state to an enabled state 772 in which some or all of the onboard sensor devices are activated and begin collecting data for the target property 750. In other words, in some embodiments, data collection can begin while the package 100 is still on the truck itself, or as the package 100 is carried from the truck to the designated destination.

Figure 8:
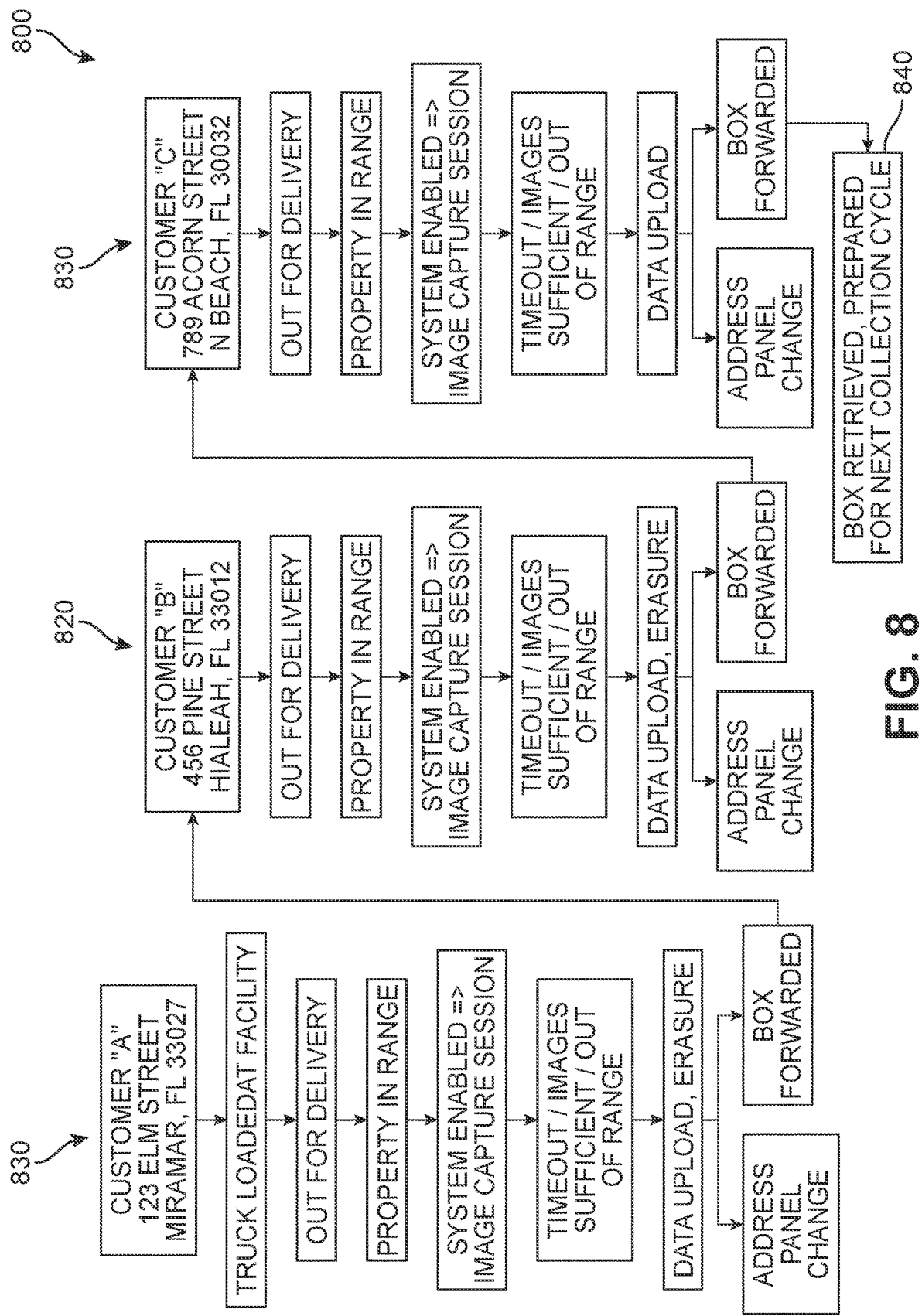
FIG. 8 is a schematic flow diagram showing the process by which the appraisal sensor package can be routed from one target property to another target property without being first returned to a package facility, according to an embodiment.

An overview of an embodiment of the image collection process 800 for multiple properties is provided in FIG. 8. In this schematic flow chart, an appraisal request is submitted for an address for a first target property in a first stage 810. A package is dispatched for the first target property. The package is loaded at the originating facility and then is sent out for delivery. During this time, the onboard package sensors are in a dormant, or disabled state, and collect no data except for the location tracking information. When the first target property is determined to be within a specific range from the package, the data collection system is enabled, and an image (and other data) capture session occurs directed to the first target property. The data capture is automatically terminated (and the system disables some or all sensor activity) when the location tracker determines the package is no longer in vicinity of the first target property, and/or following a pre-selected "timeout" period. In another example, the movement of the package from the truck to (for example) a front door can involve data collection, but once the data include only static (unchanging) information, indicating the package has been deposited at the property, the system can become disabled. At this time, data that was stored on the onboard computing system may be transmitted over a cellular network to the remote server for further processing and storage. Alternatively, the computing system may connect with a local network (i.e., associated with the first target property) or a local computing device, as discussed earlier, in order to complete the upload of its collected data. in some embodiments, once the data has been transferred, automatic data erasure from the onboard memory can occur, to ensure security of the private image data from inadvertently being exposed to the next recipient, or being mistakenly associated with the next target property. The information for the next, second target property is either transmitted from the server directly via the network or through the user device, and the address display is refreshed to present the next address. The package can then be set outside for pick up, or dropped off at a nearby delivery service center.

In a second stage 820, the package travels from the first target property to the second target property. In some cases, this delivery is direct (i.e., the retrieval service carries the package from point A to point B) or with a stop at the delivery service center. The second address is now displayed on the e-ink based display, and the package is again sent out for delivery. During this time of transit, the onboard package sensors are in a dormant, or disabled state, and collect no data except for the location tracking information. When the second target property is determined to be within a specific range from the package, the data collection system is enabled, and an image (and other data) capture session occurs directed to the second target property. The data capture is automatically terminated (and the system disables some or all sensor activity) when the location tracker determines the package is no longer in vicinity of the second target property, and/or following a pre-selected "timeout" period. In another example, the movement of the package from the truck to (for example) a front door can involve data collection, but once the data include only static (unchanging) information, indicating the package has been deposited at the property, the system can become disabled. At this time, data that was stored on the onboard computing system may be transmitted over a cellular network to the remote server for further processing and storage. Alternatively, the computing system may connect with a local network (i.e., associated with the second target property) or a local computing device, as discussed earlier, in order to complete the upload of its collected data. in some embodiments, once the data has been transferred, automatic data erasure from the onboard memory can occur, to ensure security of the private image data from inadvertently being exposed to the next recipient, or being mistakenly associated with the next target property. The information for the next, third target property is either transmitted from the server directly via the network or through the user device, and the address display is refreshed to present the next address. The package can then be set outside for pick up, or dropped off at a nearby delivery service center.

In a third stage 830, the package travels from the second target property to the third target property. In some cases, this delivery is direct (i.e., the retrieval service carries the package from point B to point C) or with a stop at the delivery service center. The third address is now displayed on the e-ink based display, and the package is again sent out for delivery. During this time of transit, the onboard package sensors are in a dormant, or disabled state, and collect no data except for the location tracking information. When the third target property is determined to be within a specific range from the package, the data collection system is enabled, and an image (and other data) capture session occurs directed to the third target property. The data capture is automatically terminated (and the system disables some or all sensor activity) when the location tracker determines the package is no longer in vicinity of the third target property, and/or following a pre-selected "timeout" period. In another example, the movement of the package from the truck to (for example) a front door can involve data collection, but once the data include only static (unchanging) information, indicating the package has been deposited at the property, the system can become disabled. At this time, data that was stored on the onboard computing system may be transmitted over a cellular network to the remote server for further processing and storage. Alternatively, the computing system may connect with a local network (i.e., associated with the second target property) or a local computing device, as discussed earlier, in order to complete the upload of its collected data. in some embodiments, once the data has been transferred, automatic data erasure from the onboard memory can occur, to ensure security of the private image data from inadvertently being exposed to the next recipient, or being mistakenly associated with the next target property. In some embodiments, the process can repeat for dozens more target properties before the package will be recalled to its origin/final destination facility. When the package is finally at its final target property, the address of the facility will be displayed on the external display, and the box is returned and prepared for the next cycle of appraisal-data collection.

For purposes of illustration, one embodiment of a method of remote data capture for property appraisals is provided. The method includes a first step of determining at a first time, at an onboard computing system for a package, the package is in a first range of a first target property. A second step includes initiating, in response to determining the package is in a first range of a first target property, an image capture session in which a first camera installed in the package is automatically activated. A third step includes collecting first image data about an external environment associated with the first target property via the first camera. In addition, a fourth step includes transmitting the first image data from the onboard computing device to a remote server via a network.

In other embodiments, the method may include additional steps or aspects. In some embodiments the method also includes steps of determining, at a subsequent second time, that the package is outside the first range of the first target property, and automatically deactivating the first camera in response to determining the package is outside the first range. In some cases, the method also includes steps of determining, at a subsequent second time, that the package has been stationary while located at the first target property for a first duration, and automatically deactivating the first camera in response to determining the package has been stationary while located at the first target property for the first duration. In some embodiments, the method also includes steps of determining, at a subsequent second time, that a timeout period has elapsed since the delivery of the package at the first target property, and automatically deactivating the first camera in response to determining the timeout period has elapsed.

In another example, the image capture session further includes activation of a second camera device installed in the package, and the method further includes collecting second image data about the external environment associated with the first target property via the second camera at the same time as the first camera collects first image data. In one embodiment, a lens for the first camera device is aligned with an aperture formed in a sidewall of the package. In some embodiments, a first address corresponding to the first target property is displayed via e-paper mounted on an exterior surface of the package. In another example, the e-paper automatically shifts or transitions to a display of a second address corresponding to a second target property after the first image data has been transmitted to the remote server. In other words, the appearance of the first address is terminated, and a new address is now displayed. In some embodiments, the method also includes a step of geotagging the first image data such that the location of any structural features captured in the first image data can be ascertained with precision.

As described herein, some of the proposed embodiments can be understood to include a data collection shipping package that can be delivered to an address and perform automated image data capture on-site at a target property. For purposes of this application, a target property refers to a location that has been identified as requiring appraisal, either in response to an underwriting for an application being processed by an insurer or other entity, or in response to a claim for damages by the owner of said property. The package includes a first camera mounted in an interior of the package, wherein a lens for the first camera is aligned with an aperture formed in a sidewall of the package, and a GPS-enabled device configured to generate location geodata for the package in real-time. A GPS provides latitude-longitude coordinates gathered by the hardware on the device which communicates with a satellite. The latitude/longitude coordinates generated by the GPS can also be referred to herein interchangeably as location data or geodata. The package also includes a computing system configured to activate the first camera in response to geodata indicating the package is in a vicinity of a target property, and a rechargeable power source supplying power to the first camera, the GPS device, and the computing system.

In some embodiments, the computing system is also configured to deactivate the first camera in response to geodata indicating the package has moved outside the vicinity of the target property. In another embodiment, the package further includes an electronic paper display (using e-ink) configured to present an address corresponding to the target property. In some embodiments, the package also includes a sensor device, the sensor device being one of an accelerometer, gyroscope, infrared light sensor, proximity sensor, and temperature sensor. In other embodiments, the package includes multiple sensors which can include an accelerometer, gyroscope, infrared light sensor, proximity sensor, and temperature sensor. In one example, the exterior surface of the package includes a flame-resistant coating.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of remote data capture for property appraisals, the method comprising:
    determining at a first time, at an onboard computing system for an appraisal sensor package, the appraisal sensor package is in a first range of a first target property;
    initiating, in response to determining the appraisal sensor package is in a first range of a first target property, an image capture session in which a first camera installed in the appraisal sensor package is automatically activated;
    collecting first image data about an external environment associated with the first target property via the first camera;
    transmitting the first image data from the onboard computing device to a remote server via a network;
    determining, at a subsequent second time, that a timeout period has elapsed since the delivery of the appraisal sensor package at the first target property; and
    automatically deactivating the first camera in response to determining the timeout period has elapsed.

2. The method of claim 1, further comprising:
    determining, at a subsequent second time, that the appraisal sensor package is outside the first range of the first target property; and
    automatically deactivating the first camera in response to determining the appraisal sensor package is outside the first range.

3. The method of claim 1, further comprising:
    determining, at a subsequent second time, that the appraisal sensor package has been stationary while located at the first target property for a first duration; and
    automatically deactivating the first camera in response to determining the appraisal sensor package has been stationary while located at the first target property for the first duration.

4. The method of claim 1, wherein the appraisal sensor package further includes a sensor device, the sensor device being one of an accelerometer, gyroscope, infrared light sensor, proximity sensor, and temperature sensor.

5. The method of claim 1, wherein the image capture session further includes activation of a second camera device installed in the appraisal sensor package, and the method further comprises collecting second image data about the external environment associated with the first target property via the second camera at the same time as the first camera collects first image data.

6. The method of claim 1, wherein a lens for the first camera device is aligned with an aperture formed in a sidewall of the appraisal sensor package.

7. The method of claim 1, wherein a first address corresponding to the first target property is displayed via e-paper mounted on an exterior surface of the appraisal sensor package.

8. The method of claim 7, wherein the e-paper automatically shifts to a display of a second address corresponding to a second target property after the first image data has been transmitted to the remote server.

9. The method of claim 1, further comprising geotagging the first image data such that the location of any structural features captured in the first image data can be ascertained with precision.

10. A data collection shipping package for property appraisals, the package comprising:
    a first camera mounted in an interior of the package, wherein a lens for the first camera is aligned with an aperture formed in a sidewall of the package;
    a GPS device configured to generate location geodata for the package in real-time;
    a computing system configured to activate the first camera in response to geodata indicating the package is in a vicinity of a target property and deactivate the first camera once a timeout period elapses following delivery of the package to the target property; and
    a rechargeable power source supplying power to the first camera, the GPS device, and the computing system.

11. The package of claim 10, wherein the computing system is also configured to deactivate the first camera in response to geodata indicating the package has moved outside the vicinity of the target property.

12. The package of claim 10, further comprising an electronic paper display configured to present an address corresponding to the target property.

13. The package of claim 10, further comprising a sensor device, the sensor device being one of an accelerometer, gyroscope, infrared light sensor, proximity sensor, and temperature sensor.

14. The package of claim 10, wherein an exterior surface of the package includes a flame-resistant coating.

15. A property appraisal system, the system comprising a processor and non-transitory computer readable medium including instructions which, when executed by the processor, cause the processor to:
    determine at a first time, at an onboard computing system for an appraisal sensor package, the appraisal sensor package is in a first range of a first target property;
    initiate, in response to determining the appraisal sensor package is in a first range of a first target property, an image capture session in which a first camera installed in the appraisal sensor package is automatically activated;

collect first image data about an external environment associated with the first target property via the first camera;

transmit the first image data from the onboard computing device to a remote server via a network;

determine, at a subsequent second time, that a timeout period has elapsed since the delivery of the package at the first target property; and automatically deactivate the first camera in response to determining the timeout period has elapsed.

16. The system of claim 15, wherein the instructions further cause the processor to:

determine, at a subsequent second time, that the appraisal sensor package is outside the first range of the first target property; and automatically deactivate the first camera in response to determining the appraisal sensor package is outside the first range.

17. The system of claim 15, wherein the instructions further cause the processor to:

determine, at a subsequent second time, that the appraisal sensor package has been stationary while located at the first target property for a first duration; and automatically deactivate the first camera in response to determining the appraisal sensor package has been stationary while located at the first target property for the first duration.

18. The system of claim 15, wherein the appraisal sensor package further includes a sensor device, the sensor device being one of an accelerometer, gyroscope, infrared light sensor, proximity sensor, and temperature sensor.

19. The system of claim 15, wherein a first address corresponding to the first target property is displayed via e-paper mounted on an exterior surface of the appraisal sensor package.

20. The system of claim 19, wherein the e-paper automatically shifts to a display of a second address corresponding to a second target property after the first image data has been transmitted to the remote server.

* * * * *